United States Patent
Beals et al.

(10) Patent No.: US 8,885,994 B2
(45) Date of Patent: Nov. 11, 2014

(54) INTEGRATED PLANAR POLYMER WAVEGUIDE FOR LOW-LOSS, LOW-CROSSTALK OPTICAL SIGNAL ROUTING

(75) Inventors: Joseph Beals, Marshfield, MA (US); Nikolas Bamiedakis, Cambridge (GB); Terry Clapp, Hertfordshire (GB); Richard Penty, Royston (GB); Ian White, Cambridge (GB); Adrian Wonfor, Cambridge (GB); Jon Degroot, Midland, MI (US)

(73) Assignees: Dow Corning Corporation, Midland, MI (US); Cambridge Enterprise Limited (GB)

( * ) Notice: Subject to any disclaimer, the term of this patent is extended or adjusted under 35 U.S.C. 154(b) by 1028 days.

(21) Appl. No.: 12/740,422

(22) PCT Filed: Nov. 21, 2008

(86) PCT No.: PCT/US2008/084310
§ 371 (c)(1),
(2), (4) Date: Oct. 4, 2010

(87) PCT Pub. No.: WO2009/073404
PCT Pub. Date: Jun. 11, 2009

(65) Prior Publication Data
US 2011/0176764 A1    Jul. 21, 2011

Related U.S. Application Data

(60) Provisional application No. 60/991,368, filed on Nov. 30, 2007.

(51) Int. Cl.
*G02B 6/125* (2006.01)
*G02B 6/12* (2006.01)

(52) U.S. Cl.
USPC ............................ 385/32; 385/14; 385/132

(58) Field of Classification Search
USPC ................................................. 385/32
See application file for complete search history.

(56) References Cited

U.S. PATENT DOCUMENTS 5,313,536 A * 5/1994 Rossi et al. ............... 385/14
5,521,992 A * 5/1996 Chun et al. ............... 385/14

(Continued)

FOREIGN PATENT DOCUMENTS

DE     10103273 A1    1/2002
EP     1 237 019 A    4/2002
WO    WO03/065414 A   7/2003

OTHER PUBLICATIONS

International PCT Search Report PCT/US08/84310 dated Mar. 6, 2009.

(Continued)

*Primary Examiner* — Michelle R Connelly
(74) *Attorney, Agent, or Firm* — Brinks Gilson & Lione

(57) ABSTRACT

The present invention provides a planar waveguide. In one embodiment, the planar waveguide includes first and third layers formed above a substrate and adjacent each other. The first and third layers are formed of a first material having a first index of refraction. The planar waveguide also includes a second layer formed between the first and third layers of a second material having a second index of refraction that is larger than the first index of refraction. The planar waveguide further includes a plurality of organo-functional siloxane based resin or polymer waveguides formed in the second layer. Each organo-functional siloxane based resin or polymer waveguide has an input on one edge of the second layer and an output on one edge of the second layer so that the input and output are on different line-of-sight paths. The plurality of organo-functional siloxane based resin or polymer waveguides is formed such that intersections of the plurality of organo-functional siloxane based resin or polymer waveguides occur at approximately right angles.

18 Claims, 6 Drawing Sheets

(56) References Cited

U.S. PATENT DOCUMENTS

| | | | |
|---|---|---|---|
| 5,757,989 A * | 5/1998 | Yoshimura et al. | 385/14 |
| 6,411,752 B1 | 6/2002 | Little | 385/17 |
| 6,442,323 B1 * | 8/2002 | Sorosiak | 385/137 |
| 6,810,160 B2 * | 10/2004 | Kato et al. | 385/14 |
| 6,993,233 B2 * | 1/2006 | Shimizu et al. | 385/129 |
| 7,068,871 B2 * | 6/2006 | Sugama et al. | 385/14 |
| 7,532,782 B2 * | 5/2009 | Bragg et al. | 385/14 |
| 2005/0196096 A1 * | 9/2005 | Ohtsu et al. | 385/14 |
| 2007/0258691 A1 * | 11/2007 | Charters et al. | 385/132 |
| 2007/0280585 A1 * | 12/2007 | Warashina et al. | 385/14 |

OTHER PUBLICATIONS

Norris A et al, XP002429342.
Kai Su et al, XP002429343.
Written Opinion for PCT/US2008/084310 dated Mar. 6, 2009.

* cited by examiner

INTEGRATED PLANAR POLYMER WAVEGUIDE FOR LOW-LOSS, LOW-CROSSTALK OPTICAL SIGNAL ROUTING

CROSS REFERENCE TO RELATED APPLICATIONS

This application is a National Stage Entry of PCT Application Ser. No. PCT/US2008/084310 filed Nov. 21, 2008, designating the United States and published in English, which claims the benefit of the filing date under 35 U.S.C. § 119(e) of U.S. Provisional Application No. 60/991,368 filed Nov. 30, 2007, the entire contents of which are hereby incorporated by reference.

BACKGROUND OF THE INVENTION

1. Field of the Invention

This invention relates to high bandwidth communication in the back-plane of interconnected circuit-board-based systems, and, more particularly, to an integrated planar polymer waveguide-based architecture for low-loss, low-crosstalk optical signal routing in such hardware.

2. Description of the Related Art

The aggregate bit rates used to transmit information in servers, routers, and high-bandwidth computing systems has steadily increased for many years and is expected to continue to increase for the foreseeable future. Electrical interconnects are conventionally used to transmit information between elements in these computing systems. For example, electrical backplanes typically use high-bandwidth serial connections to facilitate communication between computing elements mounted on cards, such as processor cards, memory cards, I/O cards, and the like. Although serial electrical interconnects have performed admirably for many years, the increasing speed and complexity of data systems have tested the limits of serial electrical interconnect technology. For example, electrical backplanes with high-bandwidth serial connections face difficult microwave engineering challenges when these connections are used to transmit at high bit rates, e.g., above 10 Gbps. Parallel electrical interconnects may address some of the limitations imposed by microwave engineering, but these approaches require complex spatial routing. Generally speaking, electrical signaling at these frequencies is constrained by electromagnetic interference and crosstalk, as well as microwave regeneration, splitting, and routing needs.

Serial optical interconnections are capable of supporting bit rates in excess of 10 Gbps. Furthermore, optical interconnects may be able to improve bandwidth-length products, eliminate electromagnetic interference effects and reduce thermal costs. Multimode polymer waveguides that can be integrated on printed circuit boards (PCBs) have been of particular interest at least in part because they offer a low cost and highly efficient solution for high speed interconnects while allowing for reduced connectorisation costs owing to relaxed alignment tolerances. Organo-functional siloxane based resins and polymers, such as polydimethyl siloxane (PDMS), exhibit low loss at data communication wavelengths (0.03-0.05 dB/cm at 850 nm) and possess excellent mechanical and thermal properties. For example, organo-functional siloxane based resins and polymers can withstand temperatures in excess of 250° C., the temperature that is typically needed for lead-free solder reflow. However, interference and crosstalk between serial optical interconnects needs to be demonstrably improved in comparison with the conventional electrical interconnects to avoid limiting the aggregate data rate of devices formed using optical interconnects. Although the incumbent electrical technology in the market has been innovative in improving electrical systems performances, it has not taken due account of the proven competencies (particularly in terms of practical manufacturable implementation and cost-performance metrics) of emergent optical technology to address these challenges and create a competitive value proposition.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, a planar waveguide and methods of forming the planar waveguide are provided. In one embodiment, the planar waveguide includes first and third layers formed above a substrate and adjacent each other. The first and third layers are formed of a first material having a first index of refraction. The planar waveguide also includes a second layer formed between the first and third layers of a second material having a second index of refraction that is larger than the first index of refraction. The planar waveguide further includes a plurality of organo-functional siloxane based resin or polymer waveguides formed in the second layer. Each organo-functional siloxane based resin or polymer waveguide has an input on one edge of the second layer and an output on the same or another edge of the second layer so that the input and output are on different line-of-sight paths. The plurality of organo-functional siloxane based resin or polymer waveguides is formed such that intersections of the plurality of organo-functional siloxane based resin or polymer waveguides occur at approximately right angles.

BRIEF DESCRIPTION OF THE DRAWINGS

The invention may be understood by reference to the following description taken in conjunction with the accompanying drawings, in which like reference numerals identify like elements, and in which.

Figure 1A:
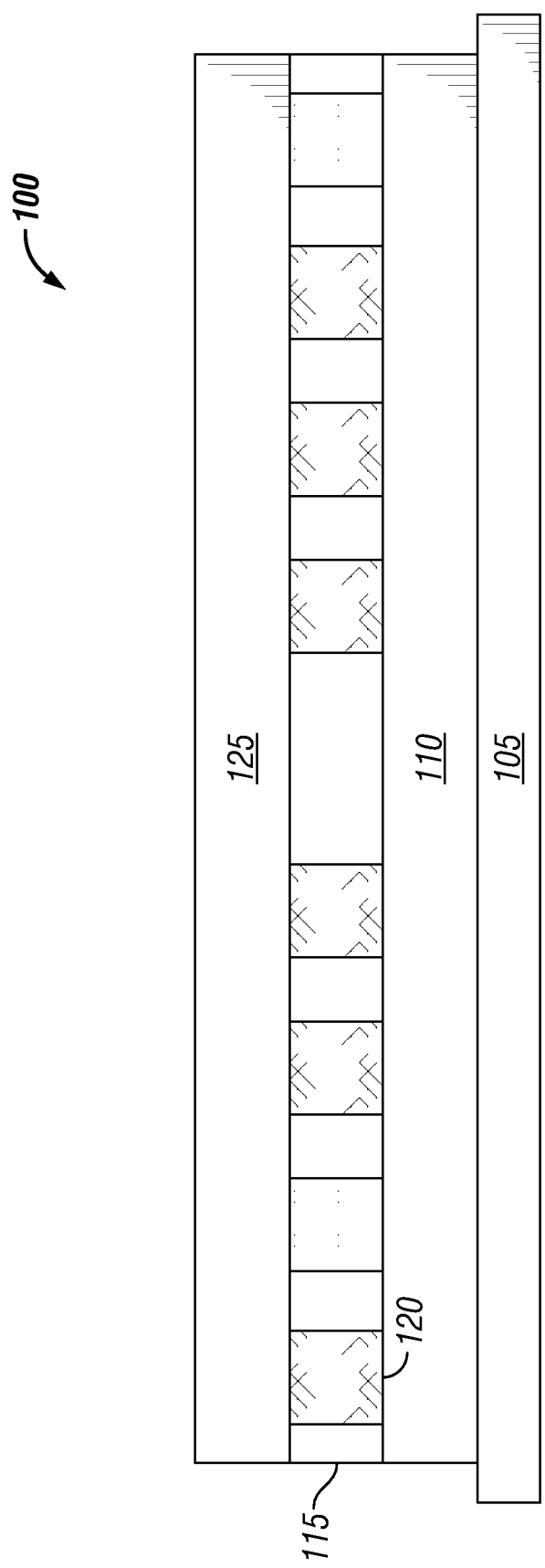
FIGS. 1A and 1B conceptually illustrate a cross-sectional view and a top-down view, respectively, of one exemplary embodiment of a planar waveguide, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1B:
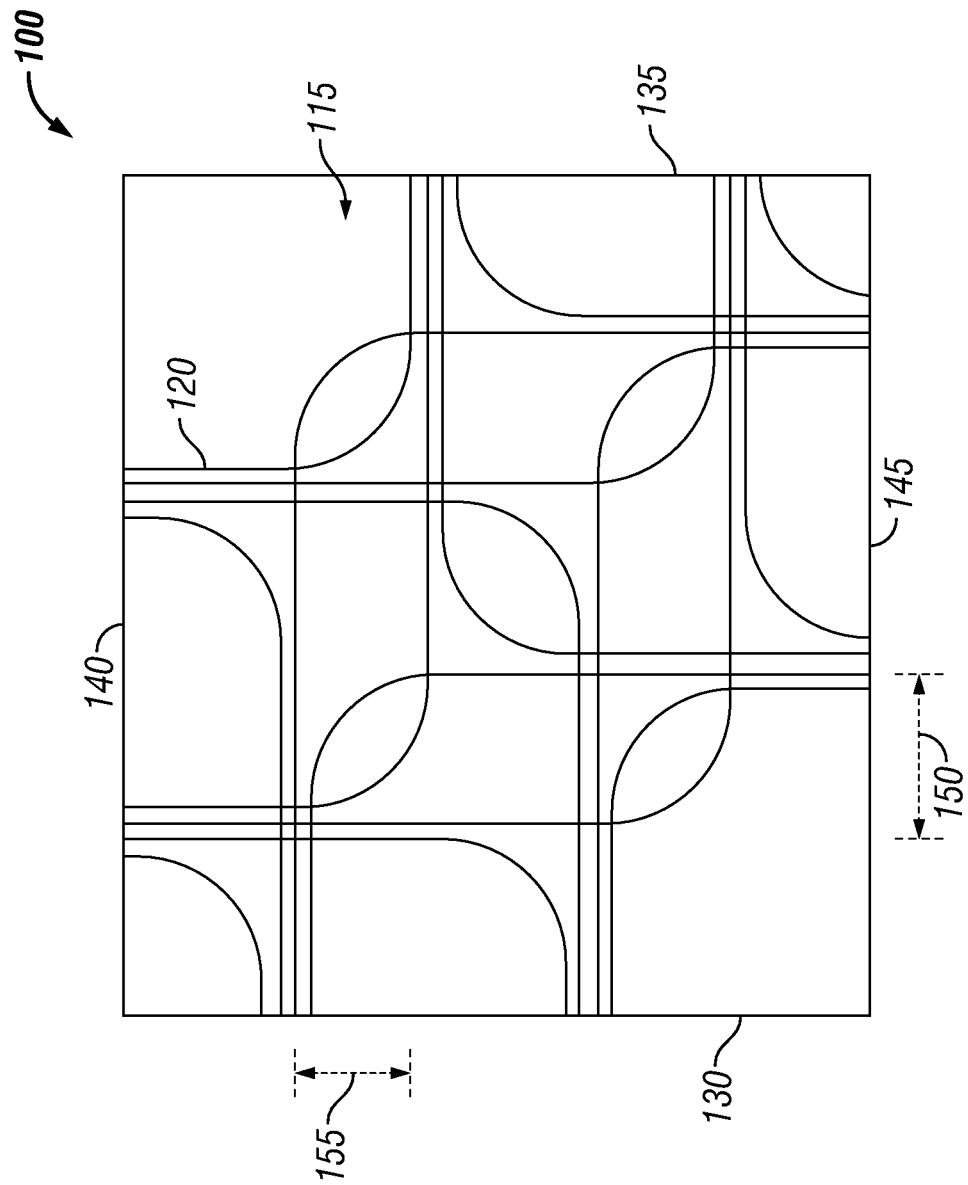

FIGS. 1A and 1B conceptually illustrate a cross-sectional view and a top-down view, respectively, of one exemplary embodiment of a planar waveguide 100. The cross-sectional view of the planar waveguide 100 shows that the planar waveguide 100 is formed on a substrate 105. Persons of ordinary skill in the art having benefit of the present disclosure should appreciate that the substrate 105 may be formed of a variety of materials including silicon, glass, metal-foils or formed parts, a glass fiber reinforced, epoxy circuit board (such as FR4 that is commonly used for commodity electronics), and the like. The particular material used to form the substrate 105 is a matter of design choice and not material to the present invention. A first layer 110, which may be referred to as a cladding layer, may then be formed adjacent the substrate 105. As used herein, the term "adjacent" does not necessarily imply that the first layer 110 and the substrate 105 are in contact. In some embodiments, the adjacent substrate 105 and first layer 110 may be separated by one or more additional layers of material. The first layer 110 is of sufficient thickness to mask the surface roughness of the underlying substrate 105 and/or any intervening layers of material. The first layer 110 also serves to create a lower optical boundary layer and optical buffer for the waveguides formed upon it, which may help reduce or avoid losses due to any adverse optical properties of the substrate.

A second layer 115 and a plurality of waveguides 120 are formed adjacent the first layer 110. In one embodiment, the waveguides 120 are formed directly adjacent the first layer 110 and the second layer 115 is formed independently of the formation of the waveguides 120, either before or after forming the waveguides 120. For example, the layer 115 may be formulated to permit direct photopatterning so that the waveguide 120 may be formed directly. Alternatively, the plurality of waveguides 120 may be formed by depositing the second layer 115 over the upper surface of the first layer 110 and then patterning the second layer 115, e.g., using conventional photolithography and/or etching techniques. One or more waveguides 120 may then be formed by the photolithography and etching of the second layer 115. The plurality of waveguides 120 may be formed of organo-functional siloxane based resins and polymers, such as polydimethyl siloxane (PDMS), which exhibit low loss at data communication wavelengths (0.03-0.05 dB/cm at 850 nm), possess excellent mechanical and thermal properties, and can withstand temperatures in excess of the 250° C. temperatures typically used for lead-free solder reflow techniques. Furthermore, the organo-functional siloxane based resins and polymers have beneficial manufacturability and performance metrics such as rheology, process flexibility, transparency range, adherence, thermal coefficient of the refractive index of adjacent layers in the waveguide 120, low strain-index tensor elements, low birefringence, and the like. A third layer 125 may then be formed adjacent to the second layer 115 and the waveguides 120. The third layer 125 may serve to protect the waveguides and planarize the surface above the planar waveguide(s) 100. Although a single layer 115 including waveguides 120 is shown in FIG. 1A, persons of ordinary skill in the art having benefit of the present disclosure should appreciate that alternative embodiments may include additional layers of waveguides 120 formed above or below the layer 115.

The properties of the layers 110, 115, 125 and the waveguides 120 are selected to facilitate the transmission of optical information along the waveguides 120. In one embodiment, the material used to form the first layer 110 and the third layer 125 is selected to have an index of refraction that is lower than the material used to form the second layer 115. The index of refraction of the material used to form the second layer 115 is also selected to be lower than the index of refraction of the material used to form the waveguides 120.

The top-down view of the planar waveguide 100 depicts the layout of the waveguides 120 formed within the second layer 115. In the illustrated embodiment, the planar waveguide 100 has a rectangular shape and the waveguides 120 are formed in the second layer 115 such that the inputs lie on parallel and opposite sides 130, 135 of the planar waveguide 100 and the outputs lie on parallel and opposite sides 140, 145 of the planar waveguide 100. However, persons of ordinary skill in the art having benefit of the present disclosure should appreciate that the present invention is not limited to configurations in which the inputs lie on parallel and opposite sides 130, 135 of the planar waveguide 100 and the outputs lie on parallel and opposite sides 140, 145 of the planar waveguide 100. Alternatively, the input/output ports may lie on the same side of the planar waveguide 100 and/or be orthogonal to each other. Preferably they are arranged so that no direct line runs from an input to an output to which that signal is not explicitly dedicated (as a line-of-sight), e.g., an optical signal applied to an input cannot follow a line-of-sight path directly to the corresponding output. Each of the waveguides 120 is formed to include an approximately 90° turn between the input and the output of the waveguide 120. In the illustrated embodiment, bends are chosen for the 90° waveguide turns rather than corner reflectors because bends do not need additional fabrication steps. The bend radius may be chosen to be sufficiently large to limit propagation losses and be commensurate with the space required to fit standard MPO ribbon fiber connectors along the edges of the planar waveguide 100. However, in alternative embodiments, other techniques such as corner reflectors may be used to effect the 90° turn in the waveguide 120. Incorporating the 90° turn between the input and the output of the waveguide 120 may enhance crosstalk performance because scattered light co-directional with a transmitter cannot reach a receiver.

The inputs and/or outputs on opposite sides 130, 135, 140, 145 of the planar waveguide 100 may also be offset from each other along a direction perpendicular to the direction of the waveguide near the corresponding input and/or output. In the illustrated embodiment, the outputs along opposite sides 140, 145 are offset by approximately a distance 150 and the inputs along opposite sides 130, 135 are offset by approximately a distance 155. Offsetting the inputs and/or outputs in this matter may reduce interference between the waveguides 120 having inputs and/or outputs along opposing sides. The waveguides 120 are also patterned so that the intersections of the waveguides 120 occur at approximately 90° angles. Configuring the waveguides 120 so that the waveguide crossings occur at 90° may reduce both crossing losses and induced crosstalk between the intersecting waveguides 120. One example of a routing pattern that may be used for the waveguides 120 is a Manhattan routing pattern. Manhattan architecture is used in technology designs (such as CMOS chip interconnect) when describing layouts which resemble the "streets of Manhattan," i.e. layouts including patterns that follow straight paths and intersect at near right angles. In alternative embodiments, layouts can take routes dictated by the board's other components. For example a diagonal (referenced to the board edge) path may take a waveguide out to some coordinate and then the path may resume a near normal path from this coordinate to some other waveguide in order to cross it.

Figure 2B:
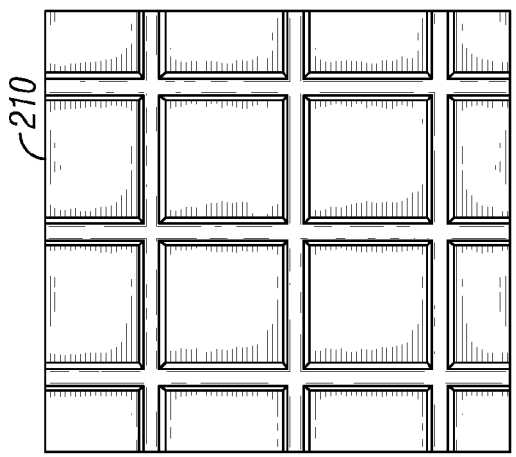
FIG. 2B conceptually illustrates the detail of the waveguide crossings in the optical backplane of FIG. 2A.
Figure 2A:
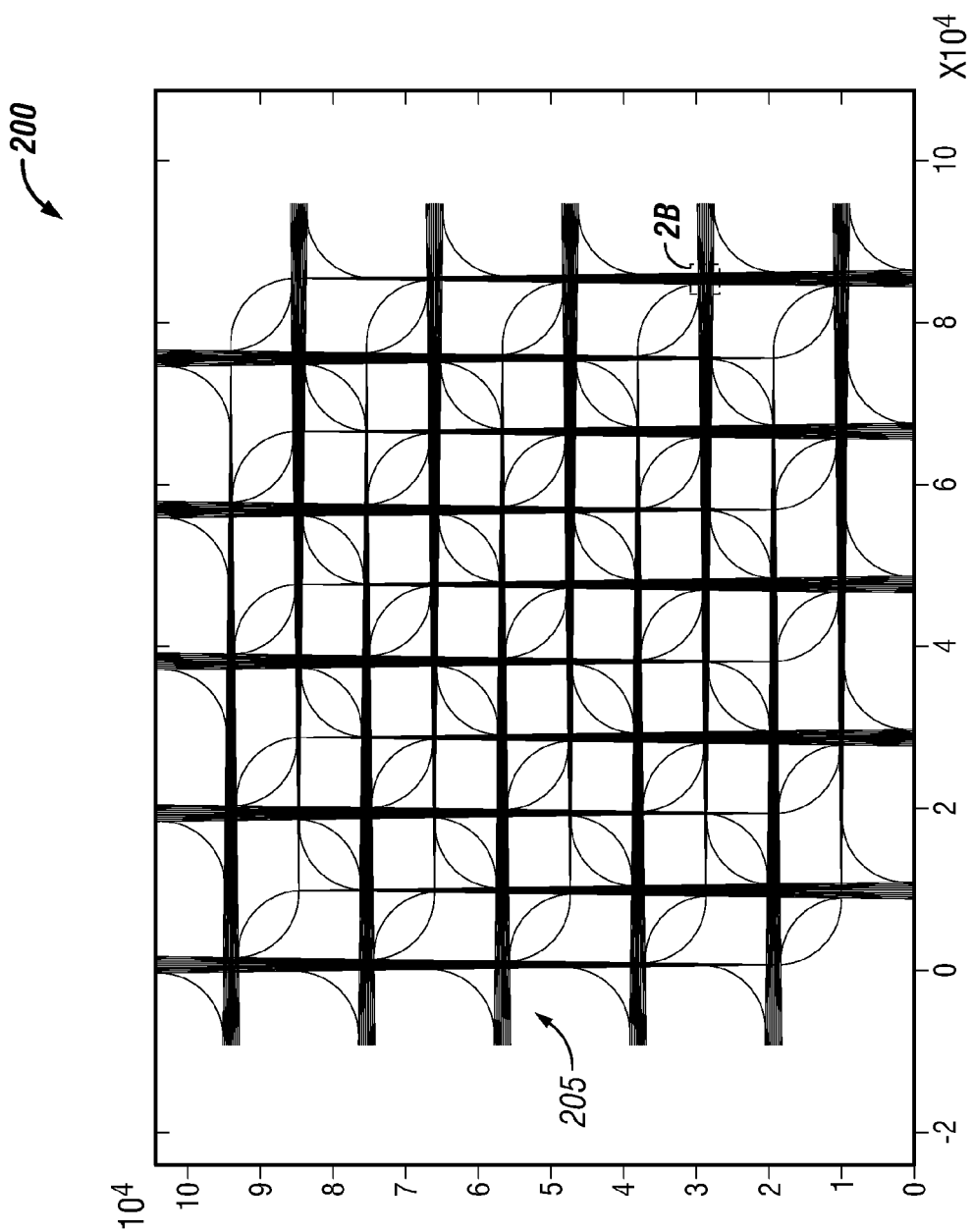
FIG. 2A conceptually illustrates one exemplary embodiment of an optical backplane, in accordance with the present invention.

FIG. 2A conceptually illustrates one exemplary embodiment of a layout of an optical backplane 200. In the illustrated embodiment, the optical backplane 200 is formed of a plurality of waveguides 205 that are configured as described with regard to FIGS. 1A and 1B. The illustrated embodiment of the optical backplane observes a number of layout requirements including compact size, scalability, compatibility with standard multimode ribbon fibre connectors, low loss and low crosstalk performance. The fabricated backplane 200 accommodates 10 cards and is patterned by conventional photolithographic techniques on a standard FR4 substrate. The lower cladding is of sufficient thickness to mask the surface roughness of the underlying FR4 while the top cladding also serves to protect the waveguides and planarise the surface. The backplane is cut from the FR4 wafer and the waveguide facets exposed using a Disco 321 dicing saw. The final 10-card backplane 200 measures 10 cm square. The input and output of each card interface consists of a 10 waveguide group. The PCB-based 10-card backplane takes the form of a rectangle and is only 2.25 rack units in height. Opposite edges are populated with like connection types (either link inputs or outputs). Hence every transmitter is connected to every receiver via a waveguide that executes one 90° turn and ribbon fibre connections are made around the backplane periphery. Crosstalk performance is thereby enhanced as any scattered light co-directional with a transmitter cannot reach any receiver.

The waveguide cross-section is chosen to be 50 ×50 μm with a lateral separation of 250 μm to match conventional ribbon fiber and standard VCSEL and photodiode arrays. The radius of the 900 bends is 8 mm which, according to previous measurements, should induce additional loss of approximately 1 dB for a multimode fibre input. The crossing losses are expected to be approximately 0.01 dB/crossing for an MMF launch of the optical signal. The number of crossings of any channel depends on the link path, with 90 crossings being the maximum. A photo detail 210 of the waveguide crossings is shown in FIG. 2B. It should be noted that the low intrinsic waveguide loss (0.03 dB/cm) together with the low crossing loss and low crosstalk values imply scalability for this architecture to a larger number of external connections. The optical backplane 200 provides passive interconnection capable of accommodating a terabit per second aggregate data rate. The architecture enables non-blocking communication between 10 cards utilizing planar polymer multimode waveguides on PCB. Despite being low cost, this 100-channel backplane exhibits excellent routing characteristics and crosstalk performance.

Figure 3:
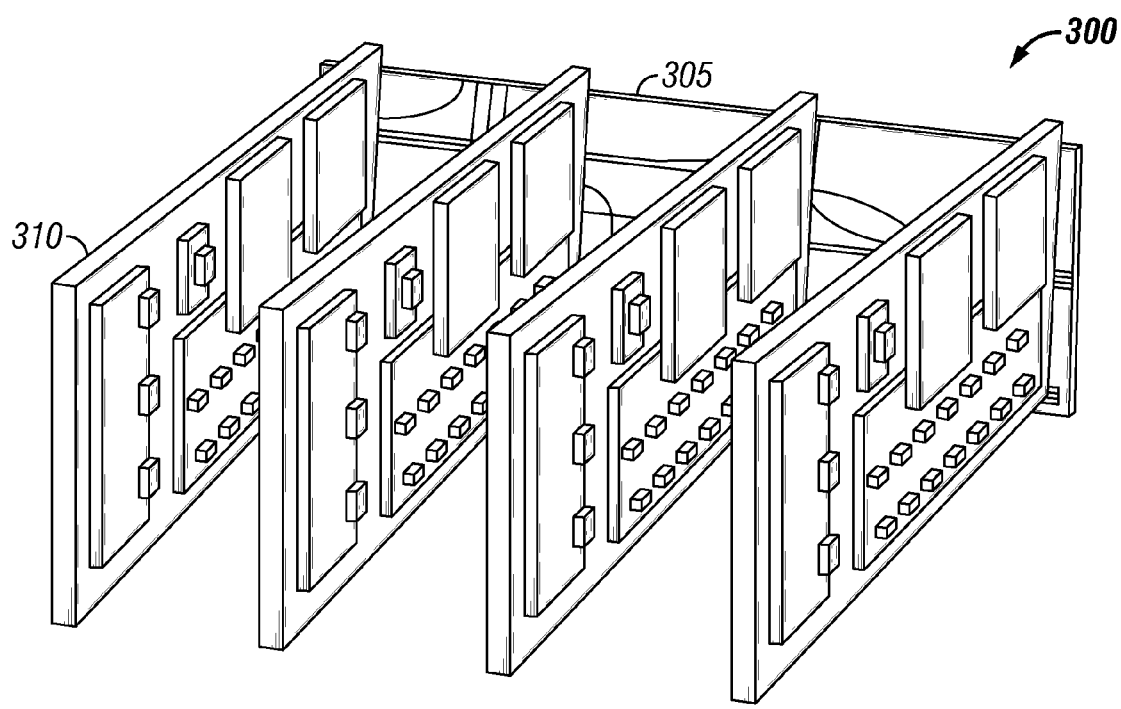
FIG. 3 conceptually illustrates one exemplary embodiment of a portion of a computing system that includes an optical backplane such as shown in FIG. 2A, in accordance with the present invention.
Figure 4:
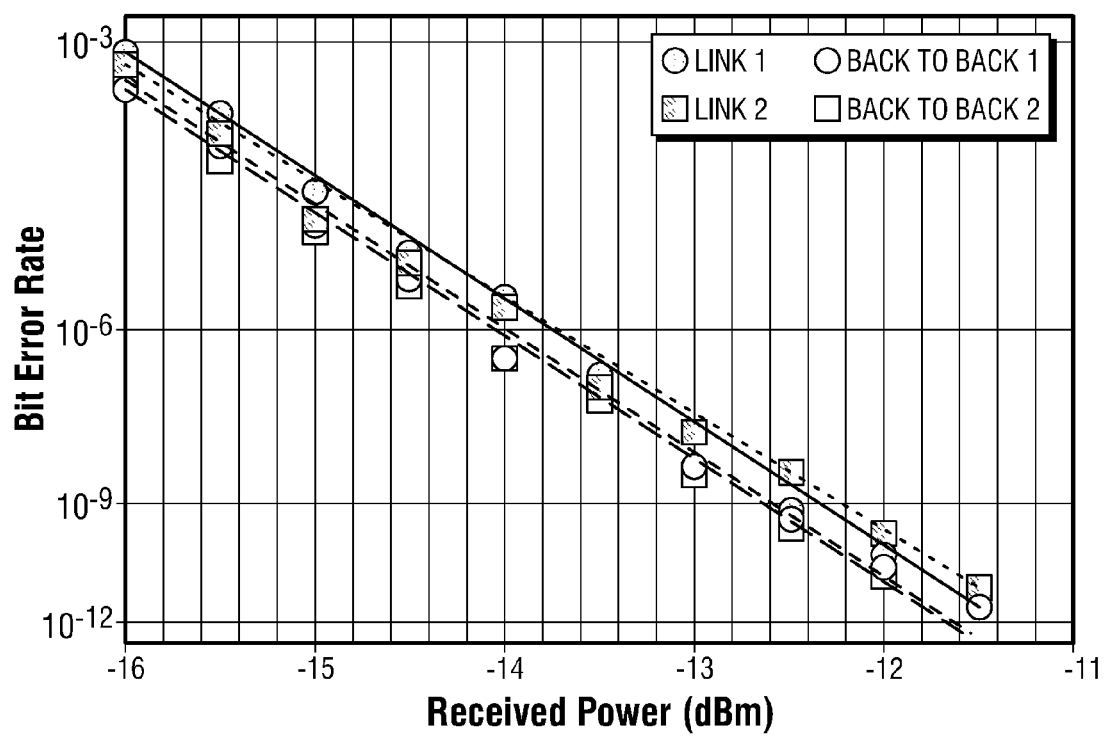
FIG. 4 shows a bit error rate plot for exemplary waveguides, such as the planar waveguide shown in FIGS. 1A and 1B, in accordance with the present invention.
Figure 5A:
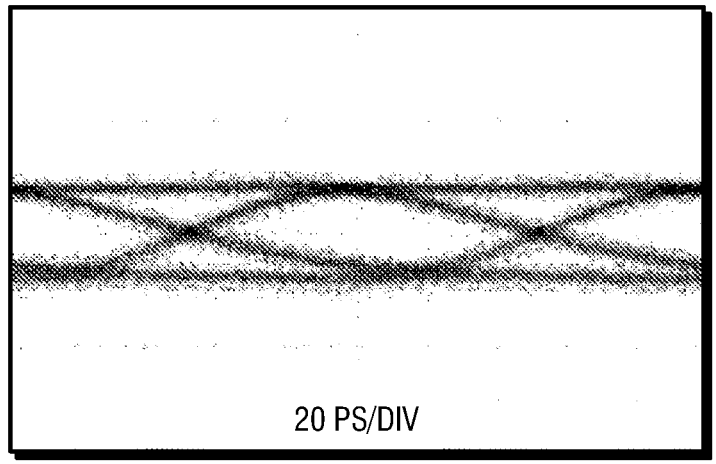
FIGS. 5A and 5B show recorded eye diagrams for back-to-back and waveguide links, in accordance with the present invention.
Figure 5B:
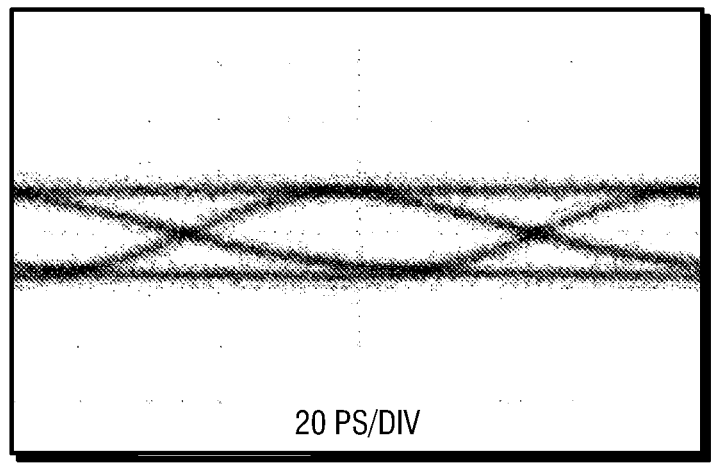

FIG. 3 conceptually illustrates one exemplary embodiment of a portion of a computing system 300 that includes an optical backplane 305 such as shown in FIG. 2. The optical backplane 305 is compatible with a rack-mount framework, e.g. by means of line cards 310 having cheap onboard VCSEL and photodiode arrays mating with intermediary ribbon fibre jumpers which connect to the optical backplane. In the illustrated embodiment, line cards 310 are therefore communicatively coupled to the optical backplane 305 using combinations of VCSELs, photodiodes, and ribbon fibers. However, persons of ordinary skill in the art having benefit of the present disclosure should appreciate that the present invention is not limited to these particular technique for coupling the line card 310 to the optical backplane 305. In alternative embodiments, other techniques for communicatively coupling the line cards 310 to the optical backplane 305 may be used.

The power transmission characteristics of one embodiment of the optical backplane have been studied using both a 50/125 μm standard cleaved MMF and a cleaved SMF input. An 850 nm multimode VCSEL is used as a source while a 50/125 μm MMF is used to collected the emitted light at the waveguide output. Index matching gel is employed at both the input and output to increase coupling efficiency. The insertion loss of each waveguide varies according to the link length and the number of crossings. A multimode fibre launch couples more power to higher order waveguide modes than a SMF launch. Consequently, reduced coupling efficiency and higher propagation losses at bends and crossings result in larger overall insertion loss values for the MMF input. Table 1 shows the variation of the insertion loss from the best case (shortest waveguide with no crossings) to the worst case (longest waveguide with 90 crossings).

TABLE 1

Range of insertion losses and worst case crosstalk values recorded using MMF and SMF launch.

| Input | Insertion | Crosstalk |
| --- | --- | --- |
| 50 | 7 to 10 dB | −32 dB |
| SMF | 2.5 to 5.6 | −42 dB |

Crosstalk measurements have been carried out to investigate performance for the different input types. Results indicate that neither radiation from bends nor cross-coupling from waveguide intersections contribute to crosstalk significantly—indeed any crosstalk induced is below the receiver sensitivity (−60 dBm). However, waveguides which run parallel to each other do cross-couple in proportion to the proximity and length of the parallel run. Worst case (long adjacent co-linear waveguides) exhibited crosstalk values below −32 dB for a MMF launch and −42 dB for a SMF launch. Additionally, misalignment of the input fibre results in slightly increased crosstalk values—worst case values are on the order of −25 dB when the input fibre is misaligned to launch the light into the cladding region between the waveguides.

Bit-error-rate (BER) measurements have been carried out using an Anritsu 12.5 Gbps BER tester. The VCSEL source is directly modulated by a $2^{31}-1$ PRBS signal at 10 Gbps while a Picometrix photodiode is used as a receiver. The optical signal is coupled in and out of the backplane using 50 μm multimode ribbon fibres. A SHF 20 GHz RF amplifier is used to amplify the received electrical signal. A digital oscilloscope is used to record the resulting eye diagrams. Several representative waveguides have been tested. Eye diagrams show negligible additional noise and pulse dispersion. Error-free transmission is achieved in all cases. The BER measurements indicate a very small power penalty on the order of 0.2 dBo for a bit-error-rate of $10^{-9}$. FIG. 2 shows a bit error rate plot for exemplary waveguides, such as the planar waveguide 100 shown in FIGS. 1A and 1B. FIGS. 3A and 3B show recorded eye diagrams for back-to-back and waveguide links.

The waveguides described herein may be formed of organo-functional siloxane based resins and polymers. One example of an organo-functional siloxane based polymer is PDMS. However, other organo-functional siloxane based resins and polymers may be used to form the waveguides and/or other layers in embodiments of the optical backplane described herein. One example of a epoxy-containing organopolysiloxane resin (A) is represented by the following siloxane unit formula:

where $R^1$, $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups; one molecule contains 2 to 50 mole % of silicone units with epoxy-containing univalent hydrocarbon groups; more than 14 mole % of all organic groups are univalent aromatic hydrocarbon group with 6 to 10 carbon atoms; and the following conditions are satisfied: a+b+c+d=1; "a" on average satisfies the following condition: 0≤d<0.4; "b" on average satisfies the following condition: O<b<0.5; "c" on average satisfies the following condition: O<c<1; "d" on average satisfies the following condition; O b d<0.4; and "b" and "c" are bound by the following condition: 0.1≤b/c≤0.3; where a, b, c, and d designate an average mole number of each siloxane unit for the case where the sum of these mole units is equal to 1. In other words, these symbols show an average mole % or share of each siloxane unit in one molecule; thus (a+b+c+d)=1. Since this component contains an epoxy group, it can be rapidly cured in the presence of a photopolymerization initiator (B) by irradiating it with active-energy rays, such as ultraviolet rays.

The epoxy-containing organopolysiloxane resin (A) contains $(R^4R^5SiO_{2/2})$ and $(R^6SiO_{3/2})$ as indispensable units. If necessary, however, the resin may contain arbitrary structural units $(R^1R^2R^3SiO_{1/2})$ and $(SiO_{4/2})$. In other words, the epoxy-containing organopolysiloxane resin may be composed of the units shown in the following formulae:

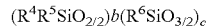

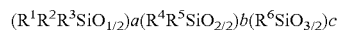

If the content of the $(R^1R^2R^3SiO_{1/2})$ units is too high, the molecular weight of the epoxy-containing organopolysiloxane resin is reduced, and the following condition takes place: 0≤a<0.4. If $(SiO_{4/2})$ units are introduced under this condition, a cured body of the epoxy-containing organopolysiloxane resin (A) may become very hard and brittle. Therefore, it is recommended to provide the following condition: 0≤d<0.4, preferably 0≤d<0.2, and even more preferably, d=0. The mole ratio b/c of the indispensable structural units $(R^4R^5SiO_{2/2})$ and $(R^6SiO_{3/2})$ should be greater than 0.01 and preferably smaller than 0.3. Beyond these limits, the production of the aforementioned epoxy-containing organopolysiloxane resin (A) will be either accompanied by the formation of insoluble by-products, or the body obtained by curing the composition will be subject to decrease in toughness and to generation of cracks, as well as to significant decrease in strength and elasticity. It is recommended that the mole ratio b/c be greater than 0.01 but smaller than 0.25 and preferably is within the range of 0.02 to 0.25. Since the epoxy-containing organopolysiloxane resin (A) contains $(R^4R^5SiO_{2/2})$ and $(R^6SiO_{3/2})$ as indispensable units, the molecular structure may vary mainly between branched, net-like and three-dimensional.

The aforementioned univalent saturated aliphatic hydrocarbon groups having 1 to 6 silicon-bonded carbon atoms may be represented by methyl groups, ethyl groups, propyl groups, butyl groups, hexyl groups, or similar univalent saturated aliphatic hydrocarbon groups; and vinyl groups, allyl groups, hexenyl groups, or similar univalent unsaturated aliphatic hydrocarbon groups. The silicon-bonded aromatic univalent hydrocarbon groups with 6 to 10 carbon atoms can be represented by phenyl groups, tolyl groups, xylyl groups, and naphthyl groups.

The refractive index, which is an important optical property of the material of the invention, can be adjusted by changing the types of univalent hydrocarbon groups. If the main substituent comprises a univalent aliphatic hydrocarbon group such as a methyl group, the refractive index can easily be made smaller than 1.5. If the main substituent comprises a univalent aromatic hydrocarbon group such as a phenyl group, the refractive index can easily be univalent saturated aliphatic hydrocarbon groups comprise methyl groups, and that aforementioned univalent unsaturated aromatic hydrocarbon groups comprise phenyl groups. In the case of univalent unsaturated aliphatic hydrocarbon groups, the use of vinyl groups is recommended.

It is recommended that, in component (A), more than 15 mole %, preferably more than 20 mole %, and even more preferably more than 25 mole % of all organic groups comprise univalent aromatic hydrocarbon groups. If the univalent aromatic hydrocarbon groups are contained in an amount below the recommended lower limit, the cured body obtained from the composition will have a reduced light transmittance in the range of communication wavelengths. This will also lead to decrease in toughness with possibility of development of cracks in the cured body.

In component (A), siloxane units having epoxy-containing univalent hydrocarbon group should constitute 2 to 50 mole %, preferably 10 to 40 mole %, and even more preferably 15 to 40 mole % of all siloxane units. If the aforementioned siloxane units are contained in an amount below 2 mole %, this will lead to a decrease in a degree of cross-linking during curing of the composition. As a result, the obtained light-transmitting component will not be sufficiently hard. If, on the other hand, the content of the aforementioned units exceeds 50 mole %, the cured body will have reduced light transmittance and low resistance to heat. It is recommended that the epoxy groups available in the aforementioned epoxy-containing univalent hydrocarbon groups do not have direct connection to silicon and that connection to silicon atoms be carried out through alkylene groups.

Some examples are given below:

3-(glycidoxy)propyl group:

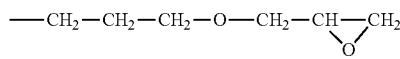

2-(glycidoxycarbonyl)propyl group:

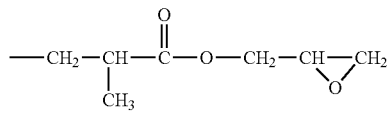

(3,4-epoxycyclohexyl)ethyl group,

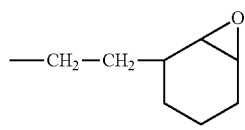

2-(4-methyl-3,4-epoxycyclohexyl)propyl group; and

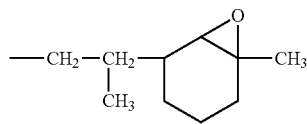

The aforementioned epoxy-containing organopolysiloxane resins can be prepared by methods known in the art. For example, the following methods are applicable: a method in which a silane of formula $R^4R^5SiCl_2$ and a silane of formula $R^6SiCl_3$ are cohydrolyzed and condensed; a method in which a silane of formula $R^4R^5SiCl_2$, a silane of formula $R^6SiCl_3$ and a silane of formula $R^1R^2R^3SiCl$ are cohydrolyzed and condensed; a method in which a silane of formula $R^4R^5SiCl_2$, a silane of formula $R^6SiCl_3$ and a silane of formula $SiCl_4$ are cohydrolyzed and condensed; a method in which a silane of formula $R^4R^5SiCl_2$, a silane of formula $R^6SiCl_3$, a silane of formula $R^1R^2R^3SiCl$, and a silane of formula $SiCl_4$ are cohydrolyzed and condensed; and a method in which silanes wherein chlorine atoms bonded to silicon are substituted by methoxy or ethoxy groups are cohydrolyzed and condensed (where $R^2$, $R^3$, $R^4$, $R^5$, and $R^6$ are organic groups selected from univalent aliphatic hydrocarbon groups with 1 to 6 carbon atoms, univalent aromatic hydrocarbon groups with 6 to 10 carbon atoms, and epoxy-containing univalent hydrocarbon groups).

Another applicable method consists of producing a silanol-containing methylphenylpolysiloxane resin by cohydrolyzing and condensing a mixture of dimethyldichlorosilane and phenyltrichlorosilane or a mixture of dimethyldichlorosilane, methyltrichlosilane and phenyltrichlorosilanethen, making the reaction system basic, carrying out a condensation reaction after adding an epoxy-containing organotrialkoxysilane, such as 3-(glycidoxy)propyltrimethoxysilane, and thus producing a methylphenylpolysiloxane resin in which an epoxy group, such as a 3-(glycidoxy)propyl group, is bonded to silicon. In the average unit formula (I), values of "a", "b", "c" and "d" can be adjusted via amounts of starting silanes and their mole ratios.

The aforementioned organopolysiloxane resin may have some residual alkoxy groups and hydroxyl groups remaining on silicon atoms. The content of these groups may depend on the method of manufacture and manufacturing conditions. These substituents may affect storage stability of the aforementioned organopolysiloxane resin and reduce thermal stability of the cured body of the organopolysiloxane resin. Therefore, it is necessary, as much as possible, to restrict the formation of such groups. For example, the amount of the aforementioned substituents can be reduced by heating the organopolysiloxane resin in the presence of a minute quantity of potassium hydroxide, thus causing a dehydration and condensation reaction or a de-alcoholation and condensation reaction. It is recommended that the content of the aforementioned substituents be no more than 2 mole % and preferably no more than 1 mole % of all substituents on silicon atoms.

There are no special restrictions with regard to the photopolymerization initiator (B) suitable for initiating photopolymerization of the epoxy-containing organopolysiloxane (A) for the present invention. Examples of this component may include sulfonium salts, iodinium salts, selenonium salts, phosphonium salts, diazonium salts, paratoluene sulfonate, trichloromethyl-substituted triazine, and trichloromethyl-substituted benzene. The organic solvent (C) is not an indispensable component, but may be required if at a temperature of molding the epoxy-containing organopolysiloxane resin (A) is in a solid state or is a highly-viscous liquid. It may also be required if the epoxy-containing organopolysiloxane resin (A) is formed into a film. The organic solvent (C) may also be required when the photopolymerization initiator (B) is not dissolved in the epoxy-containing organopolysiloxane resin (A). There are no special restrictions with regard to the 'type of the organic solvent (C), if the epoxy-containing organopolysiloxane resin (A) and the photopolymerization initiator (B) are both soluble in this solvent. It is recommended, however, to use the solvent with the boiling point within the temperature range of 80° C. to 200° C.

Embodiments of the active energy ray-curable organopolysiloxane resin composition comprise 100 parts by weight of the epoxy-containing organopolysiloxane resin (A), 0.05 to 20 parts by weight of the photopolymerization initiator (B), and 0 to 5000 parts by weight of the organic solvent (C). If component (A) is liquid or if components (A) and (B) have very good miscibility, component (C) may not be required. If component (B) is used in an amount of less than 0.05 parts by weight, the composition may not be cured to a sufficient degree. If, on the other hand, the amount of component (B) exceeds 20 parts by weight, the obtained material may have unacceptable optical characteristics due to the presence of the residual catalyst. Furthermore, if component (C) is used in an amount exceeding 5000 parts by weight, it will be difficult to obtain a thin film of good quality in the below-described process of manufacturing of the light-transmitting component. The optimal amount of component (C) may vary depending on the type, state, and solubility of components (A) and (B). In general, however, it is used in an amount of 1 to 1000 parts by weight, preferably, 1 to 500 parts by weight.

Normally, when the active energy rays-curable organopolysiloxane resin composition is intended for the preparation of cured bodies in the form of a film or light-transmitting elements, it is used in the form of a liquid with a viscosity of 20 to 10,000 mPa·s at 25° C. Beyond the recommended range of viscosities, the composition will be difficult to treat, and it will be difficult to obtain optically acceptable thin films.

The refractive index of a cured body produced from the active-energy ray-curable resin composition of the present invention can be precisely adjusted by changing a mole ratio of univalent aliphatic hydrocarbon groups (typically, methyl groups) and univalent aromatic hydrocarbon groups (typically, phenyl groups) that comprise substituents of the epoxy-containing organopolysiloxane resin (A). An increase in the proportion of the univalent aromatic hydrocarbon groups increases the refractive index, while an increase in the share of the univalent aliphatic groups decreases the refractive index.

When the active energy ray-curable organopolysiloxane resin composition is used for the manufacture of optical waveguides, the cured body of the organopolysiloxane resin intended for the core portion should have a higher refractive index than the cured body of the organopolysiloxane resin intended for the cladding portion. Therefore, the organopolysiloxane resin composition intended for the core portion should have a greater content of the univalent aromatic hydrocarbon groups than the organopolysiloxane resin composition intended for the cladding portion. In view of the above, it is possible to utilize separation methods for separating two different types of organopolysiloxane resins for core and cladding in order to maintain them in different mole ratios, and/or to utilize mixing methods for mixing the aforementioned organopolysiloxanes in different mixing ratios.

A light-transmitting component comprising a cured body obtained by curing the epoxy-containing organopolysiloxane resin (A) in the presence of the photopolymerization initiator (B) may have excellent shape-maintaining properties irrespective of whether it is made in the form of a conventional film or a thin film. More specifically, this material has hardness and elasticity that does not allow the material to be easily deformed. Furthermore, the material is free of any noticeable cracks or warps. Furthermore, in the range of a visible light, the material excludes reflection and provides light transmittance equal almost to 100%. In measurements with a polarization element, the aforementioned material makes it possible to reduce the complex refractive index to a negligibly small value, since the material is not sensitive to the polarization light. When the material is heated, it preserves its initial shape up to 260° C., and the weight change factor is kept below 1%. Therefore, it can be stated that the light-transmitting component of the present invention has thermal resistance higher than such optical thermoplastic materials as a fluorinated polymethylmethacrylate resin.

The light-transmitting component described herein is applicable for both passive-system elements and active-system elements. The following are examples of such applications: non-branched type optical waveguides, wave division multiplexers [WDM], branched optical waveguide, optical adhesives or similar passive light-transmitting elements, optical waveguide switches, optical attenuators, and optical amplifiers or similar active light-transmitting elements.

The following description will relate to a method for manufacturing light-transmitting components in the form of cured bodies of the epoxy containing organopolysiloxane resin (A) produced by irradiating the aforementioned resin (A) in the presence of the photopolymerization initiator. The aforementioned light-transmitting component is manufactured by a method that comprises the steps 1) and 2) described below. In step 1), the active-energy ray-curable organopolysiloxane resin composition is uniformly spread on the surface of a substrate, and, if necessary, solvent (C) is removed by drying or heating, whereby a thin film of uniform thickness composed of epoxy-containing organopolysiloxane resin (A) and photopolymerization initiator (B) is formed.

The substrate used for this purpose should have a smooth surface and be stable with regard to the solvent, the active-energy rays, and heat. Examples of such substrate include silicon wafers, glass, ceramics, and heat-resistant plastics. The composition is normally applied by spin coating and is then heated at a temperature between 30° C. and 120° C. In step 2), the obtained thin film is cured by irradiating it with active-energy rays. The active-energy rays may comprise ultraviolet rays, electron beams, or other radiation. The use of ultraviolet rays is preferable from the point of view of low cost and high stability. A source of ultraviolet radiation may comprise a high-pressure mercury lamp, medium-pressure mercury lamp, Xe—Hg lamp, or a deep UV lamp. The amount of radiation should be within the range of 100 to 8000 mJ/cm$^2$. For some types of active energy ray-curable organopolysiloxanes the use only of the active energy ray radiation may appear to be insufficient. In this case, heating (hereinafter referred to as "post-heating") may be required to complete curing of the thin film. The post-heating temperature should be within the range of 50 to 200° C.

Thus, the light-transmitting component of high light transmittance in a designated wavelength range is produced by 1) applying the active-energy ray-curable organopolysiloxane resin composition onto a substrate, 2) irradiating the applied active-energy ray-curable organopolysiloxane resin composition with active-energy rays, such as ultraviolet rays, and, if necessary, subjecting the composition to post-heating. If necessary, the material can be produced in the form of a separate film by peeling the coating off from the substrate. An optical waveguide, which is a typical example of application for a light-transmitting component, can be produced by repeating steps 1) and 2). Given below is a typical example of manufacturing an optical waveguide.

First, an active energy ray-curable organopolysiloxane resin composition for the cladding layer is applied by spin coating onto a substrate, and the applied material is cured by irradiation with active-energy rays to form a lower cladding layer. Following this, an active energy ray-curable organopolysiloxane resin composition for the core layer is applied by spin coating onto the lower cladding layer, if necessary, the core layer is subjected to forming for imparting to it a desired shape, and is then cured to form a cured core layer with the refractive index greater than that of the cladding layer. The core layer may be treated for imparting to it a desired shape, e.g., for patterning. This shape can be formed by exposing the core layer to active-energy rays through a drawn mask, if necessary, with subsequent heating, and the unexposed areas are removed by dissolving with an organic solvent. It is recommended that this solvent comprise solvent (C). The surface of the aforementioned core layer, or of the patterned core layer, and of the lower cladding layer is coated with the active energy ray-curable organopolysiloxane resin composition intended specially for cladding, and after the composition is cured and the formation of the upper cladding layer is completed, a film-type optical waveguide having a cladding-core-cladding structure is produced.

Similar to the procedure described earlier, the obtained coating can be peeled off from the substrate to form a film-type optical waveguide. Furthermore, the lower cladding layer may also be peeled off from the substrate. A new core layer can be formed on the separated cladding layer and then coated with an upper cladding layer, whereby another film-type optical waveguide can be formed. The cured bodies of the active energy ray-curable organopolysiloxane resin composition intended for cores should have refractive indices greater than those of the cured bodies produced from the active energy ray-curable organopolysiloxane resin composition for claddings. If necessary, a solvent-cast method can be used instead of spinning for application of the active energy ray-curable organopolysiloxane resin compositions.

Additional details and examples may be found in Watanabe, et al. (WO 2005/056640 A1), which is hereby incorporated by reference in its entirety.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. An apparatus, consisting of:
   first and third layers formed above a substrate and adjacent each other, the first and third layers being formed of a first material having a first index of refraction;
   a second layer formed between the first and third layers, the second layer being formed of a second material having a second index of refraction that is larger than the first index of refraction; and
   a plurality of organo-functional siloxane based resin or polymer waveguides formed in the second layer and in the plane defined by the adjacent first and third layers, each organo-functional siloxane based resin or polymer waveguide having an input on one edge of the second layer and an output on one edge of the second layer so that the input and output are on different line-of-sight paths, the plurality of organo-functional siloxane based resin or polymer waveguides being formed such that intersections of the plurality of organo-functional siloxane based resin or polymer waveguides occur at approximately right angles and each of the plurality of organo-functional siloxane based resin or polymer waveguides includes a substantially 90° turn between the input and the output signals.

2. The apparatus of claim 1, wherein the plurality of organo-functional siloxane based resin or polymer waveguides comprise a plurality of organo-functional siloxane based resin or polymer waveguides that are routed according to a Manhattan routing pattern.

3. The apparatus of claim 1, wherein the substantially 90° turn in each of the plurality of organo-functional siloxane based resin or polymer waveguides are effected by using a bend or corner reflector.

4. The apparatus of claim 1, wherein the inputs on the opposite edges of the second layer are offset from each other in a direction perpendicular to the direction of the corresponding organo-functional siloxane based resin or polymer waveguide proximate the input.

5. The apparatus of claim 1, wherein the outputs on the opposite edges of the second layer are offset from each other in a direction perpendicular to the direction of the corresponding organo-functional siloxane based resin or polymer waveguide proximate the output.

6. The apparatus of claim 1, wherein the inputs and the outputs are configured to be coupled to ribbon fiber jumpers.

7. A method, consisting of:
   forming first and third layers above a substrate and adjacent each other, the first and third layers being formed of a first material having a first index of refraction;
   forming a second layer between the first and third layers, the second layer being formed of a second material having a second index of refraction that is larger than the first index of refraction; and
   forming a plurality of waveguides of at least one of a organo-functional siloxane based resin or polymer in the second layer and in the plane defined by the adjacent first and third layers, each polymer waveguide having an input on one edge of the second layer and an output on one edge of the second layer so that the input and output are on different line-of-sight paths, the plurality of polymer waveguides being formed such that intersections of the plurality of polymer waveguides occur at approximately right angles and each of the plurality of organo-functional siloxane based resin or polymer waveguides includes a substantially 90° turn between the input and the output signals.

8. The method of claim 7, wherein forming the plurality of organo-functional siloxane based resin or polymer waveguides comprises forming the plurality of organo-functional siloxane based resin or polymer waveguides so that the plurality of organo-functional siloxane based resin or polymer waveguides are routed according to a Manhattan routing pattern.

9. The method of claim 7, wherein forming the plurality of organo-functional siloxane based resin or polymer waveguides to include a substantially 90° turn between the input and the output comprises forming the plurality of organo-functional siloxane based resin or polymer waveguides such that the substantially 90° turn is effected in each of the plurality of organo-functional siloxane based resin or polymer waveguides by using a bend or corner reflectors.

10. The method of claim 7, wherein forming the plurality of organo-functional siloxane based resin or polymer waveguides comprises forming the plurality of organo-functional siloxane based resin or polymer waveguides such that the inputs on the opposite edges of the second layer are offset from each other in a direction perpendicular to the direction of the corresponding polymer waveguide proximate the input.

11. The method of claim 7, wherein forming the plurality of organo-functional siloxane based resin or polymer waveguides comprises forming the plurality of organo-functional siloxane based resin or polymer waveguides such that the outputs on the opposite edges of the second layer are offset from each other in a direction perpendicular to the direction of the corresponding organo-functional siloxane based resin or polymer waveguide proximate the output.

12. The apparatus of claim 7, comprising forming the inputs and the outputs so that they can be coupled to ribbon fiber jumpers.

13. A planar waveguide, formed by a process consisting of:
   forming first and third layers above a substrate and adjacent each other, the first and third layers being formed of a first material having a first index of refraction;

forming a second layer between the first and third layers, the second layer being formed of a second material having a second index of refraction that is larger than the first index of refraction; and forming a plurality of organo-functional siloxane based resin or polymer waveguides in the second layer and in the plane defined by the adjacent first and third layers, each organo-functional siloxane based resin or polymer waveguide having an input on one edge of the second layer and an output on one edge of the second layer so that the input and output are on different line-of-sight paths, the plurality of organo-functional siloxane based resin or polymer waveguides being formed such that intersections of the plurality of polymer waveguides occur at approximately right angles and each of the plurality of organo-functional siloxane based resin or polymer waveguides includes a substantially 90° turn between the input and the output signals.

14. The planar waveguide formed by the process of claim 13, wherein forming the plurality of organo-functional siloxane based resin or polymer waveguides comprises forming the plurality of organo-functional siloxane based resin or polymer waveguides so that the plurality of organo-functional siloxane based resin or polymer waveguides are routed according to a Manhattan routing pattern.

15. The planar waveguide formed by the process of claim 13, wherein forming the plurality of organo-functional siloxane based resin or polymer waveguides comprises to include a substantially 90° turn between the input and the output comprises forming the plurality of organo-functional siloxane based resin or polymer waveguides such that the substantially 90° turn is effected in each of the plurality of organo-functional siloxane based resin or polymer waveguides by using a bend or corner reflectors.

16. The planar waveguide formed by the process of claim 13, wherein forming the plurality of organo-functional siloxane based resin or polymer waveguides comprises forming the plurality of organo-functional siloxane based resin or polymer waveguides such that the inputs on the opposite edges of the second layer are offset from each other in a direction perpendicular to the direction of the corresponding organo-functional siloxane based resin or polymer waveguide proximate the input.

17. The planar waveguide formed by the process of claim 13, wherein forming the plurality of organo-functional siloxane based resin or polymer waveguides comprises forming the plurality of organo-functional siloxane based resin or polymer waveguides such that the outputs on the opposite edges of the second layer are offset from each other in a direction perpendicular to the direction of the corresponding organo-functional siloxane based resin or polymer waveguide proximate the output.

18. The planar waveguide formed by the process of claim 13, comprising forming the inputs and the outputs so that they can be coupled to ribbon fiber jumpers.

* * * * *